United States Patent [19]

Riach et al.

[11] Patent Number: 5,751,842
[45] Date of Patent: May 12, 1998

[54] DOCUMENT TRANSACTION APPARATUS

[75] Inventors: David J. A. Riach, Edinburgh; Richard J. Longmore, Cairneyhill; John N. Eccles, Edinburgh, all of Scotland

[73] Assignee: NCR Corporation, Dayton, Ohio

[21] Appl. No.: 749,879

[22] Filed: Nov. 15, 1996

Related U.S. Application Data

[63] Continuation of Ser. No. 485,854, Jun. 7, 1995, abandoned, which is a continuation of Ser. No. 168,290, Dec. 17, 1993, abandoned.

[30] Foreign Application Priority Data

Jul. 1, 1993 [GB] United Kingdom .................. 9313640

[51] Int. Cl.$^6$ .............................. G06K 9/00; G07F 19/00
[52] U.S. Cl. .................... 382/137; 382/139; 235/379; 902/18
[58] Field of Search ................. 382/119, 135, 382/137–138, 140, 175, 224, 309, 311, 173, 139; 358/462, 467; 364/225.2, 225.3; 235/379; 902/18, 21, 36, 6, 8

[56] References Cited

U.S. PATENT DOCUMENTS

| 2,930,296 | 3/1960 | Simjian | 346/22 |
|---|---|---|---|
| 4,264,808 | 4/1981 | Owens et al. | 382/7 |
| 4,405,856 | 9/1983 | Poisson | 235/381 |
| 4,454,610 | 6/1984 | Sziklai | 382/119 |
| 4,523,330 | 6/1985 | Cain | 382/7 |
| 4,743,743 | 5/1988 | Fukatsu | 235/379 |
| 4,907,285 | 3/1990 | Nakano et al. | 382/61 |
| 4,949,392 | 8/1990 | Barski et al. | 382/61 |
| 5,274,567 | 12/1993 | Kallin et al. | 382/7 |
| 5,416,849 | 5/1995 | Huang | 382/173 |
| 5,422,467 | 6/1995 | Graef et al. | 253/379 |

FOREIGN PATENT DOCUMENTS

| 0474360 | 3/1992 | European Pat. Off. | G07G 1/12 |
|---|---|---|---|
| 0473358 | 4/1993 | European Pat. Off. | G06F 15/21 |
| 2312984 | 9/1973 | Germany | G07D 1/00 |
| 2238415 | 5/1991 | United Kingdom . | |
| 2244583 | 12/1991 | United Kingdom . | |

OTHER PUBLICATIONS

"Intelligent Forms Processing" R.G. Casey et al. IBM Systems Journal vol. 29, No. 3, 1990 pp. 435–450.

Giesen, "How Buck Rogers is Bailing out ATMs", Credit Card Management, Nov. 1992, p. 73.

"Interbold, NCR WOW 'em With Machines that Allow Item Imaging at the Branch Level", Bank Now Product News, Jan. 1991, p. 1.

Primary Examiner—Leo Boudreau
Assistant Examiner—Bhavesh Mehta
Attorney, Agent, or Firm—Michael Chan

[57] ABSTRACT

A self-service financial document processing terminal (10) accepts from a user a document (100) to be processed for a financial transaction such as depositing a cheque or paying a bill. After processing, the terminal (10) issues a receipt slip (300) to the user containing printed details of the transaction (302,304) together with a printed image (306) of significant portions of the document (100).

1 Claim, 8 Drawing Sheets

DOCUMENT TRANSACTION APPARATUS

This is a continuation of application Ser. No. 08/485,854 filed on Jun. 7,1995, now abandoned, which is a continuation of application Ser. No. 08/168,290, filed Dec. 17, 1993, now abandoned.

BACKGROUND OF THE INVENTION

1. Field of Invention

This invention relates to transaction apparatus of the kind suitable for processing documents such as, for example, cheques and bills for payment.

2. Background Information

The processing by financial institutions, such as banks, of financial documents such as cheques to be deposited and bills to be paid is a costly and time consuming operation. Very often a customer wishing to perform a financial transaction, such as depositing a cheque or paying a bill, must wait in a long line to receive service from a bank teller to perform the transaction. Various suggestions have been made to automate these functions.

For example, UK Patent Application No. 2 238 415 discloses a financial self-service terminal which can accept cheques or other documents for effecting financial transactions. Data is printed on the document, and an image of the printed document is captured and displayed to the user for approval. At the end of the transaction, a transaction printer prints a ticket providing a record of the transaction. However, after the transaction has been completed, the customer may lack confidence that the document has been correctly identified and processed.

SUMMARY OF THE INVENTION

It is an object of the present invention to provide a transaction apparatus for processing documents wherein the user of the apparatus can have greater confidence than in the past that a document has been correctly identified and processed.

Therefore, according to the present invention, there is provided a transaction apparatus, including document input means adapted to receive a transaction document to be processed, said document relating to a transaction being effected by a customer using said transaction apparatus, printing means, control means adapted to cause said printing means to print transaction information relating to said transaction on a receipt slip, and slip issuing means adapted to deliver the printed receipt slip to the customer, characterized in that said control means is adapted to cause said printing means to print on said receipt slip an image of at least a portion of said document.

It will be appreciated that the apparatus according to the invention provides a receipt slip bearing an image of at least a portion of a document being processed by the apparatus. This enables the customer's confidence to be maintained that the document has been correctly identified and processed by the apparatus.

One embodiment of the present invention will now be described by way of example, with reference to the accompanying specification, claims, and drawing.

DETAILED DESCRIPTION OF THE PREFERRED EMBODIMENT

Figure 1:
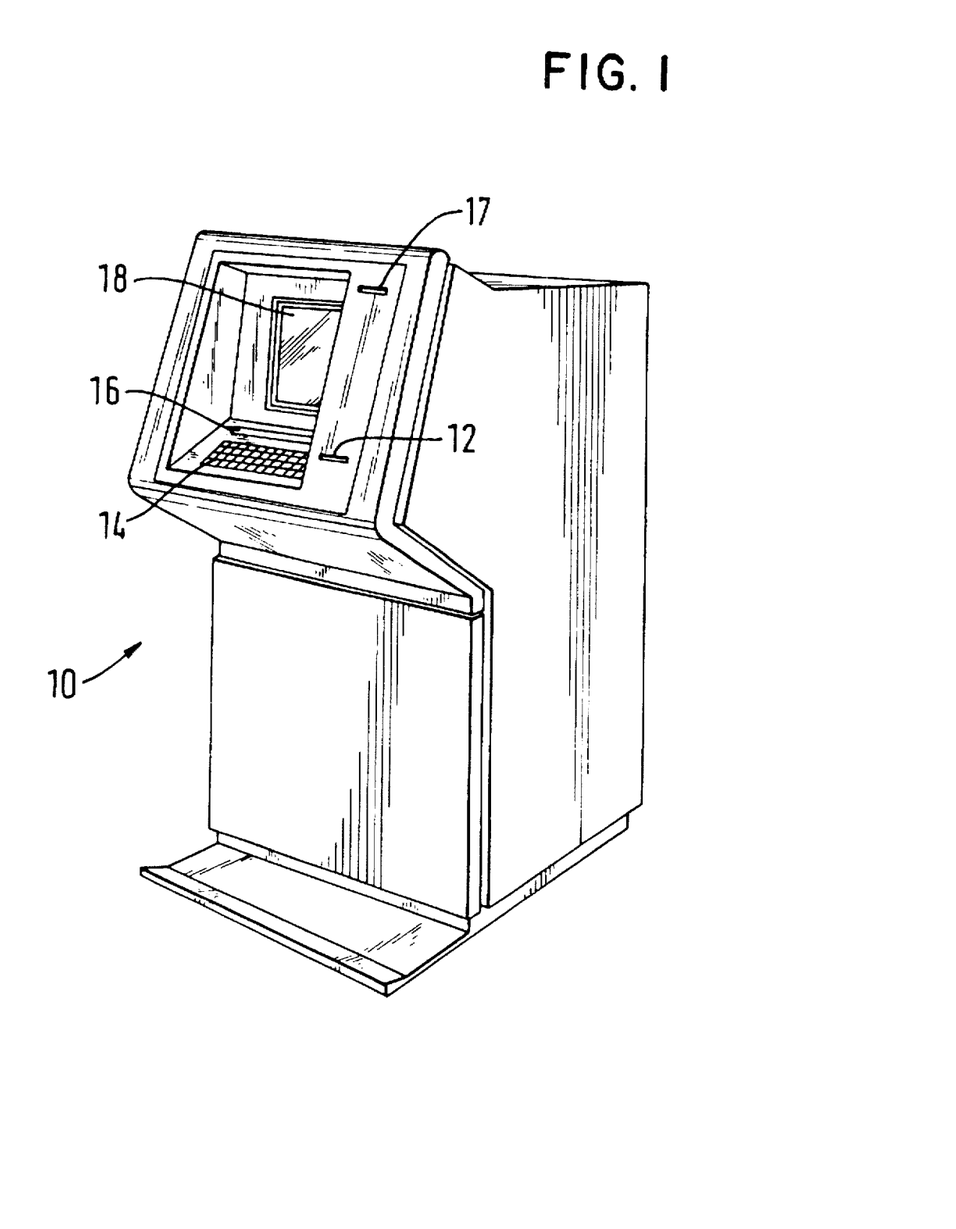
FIG. 1 is a perspective view of a self-service document processing terminal incorporating the present invention.

Referring first to FIG. 1, there is shown a perspective view of a self-service document processing terminal 10 incorporating the present invention. The terminal 10 is a self-service device adapted for operation by a customer for the purpose of paying bills, depositing cheques, or printing a statement of the customer's account. It will be appreciated that the terminal 10 is connected in operation to data processing circuitry (not shown) suitable for electronic funds transfer, whereby the customer's account can be automatically debited, credited, or read out.

The terminal 10 includes a slot 12 for entry of the customer's banking card, a keyboard 14 for entry of information and control functions, a slot 16 for receiving a bill to be paid or a cheque to be deposited and for delivering a statement to a customer, a slot 17 for issuing a receipt slip, and a display screen 18.

Figure 2:
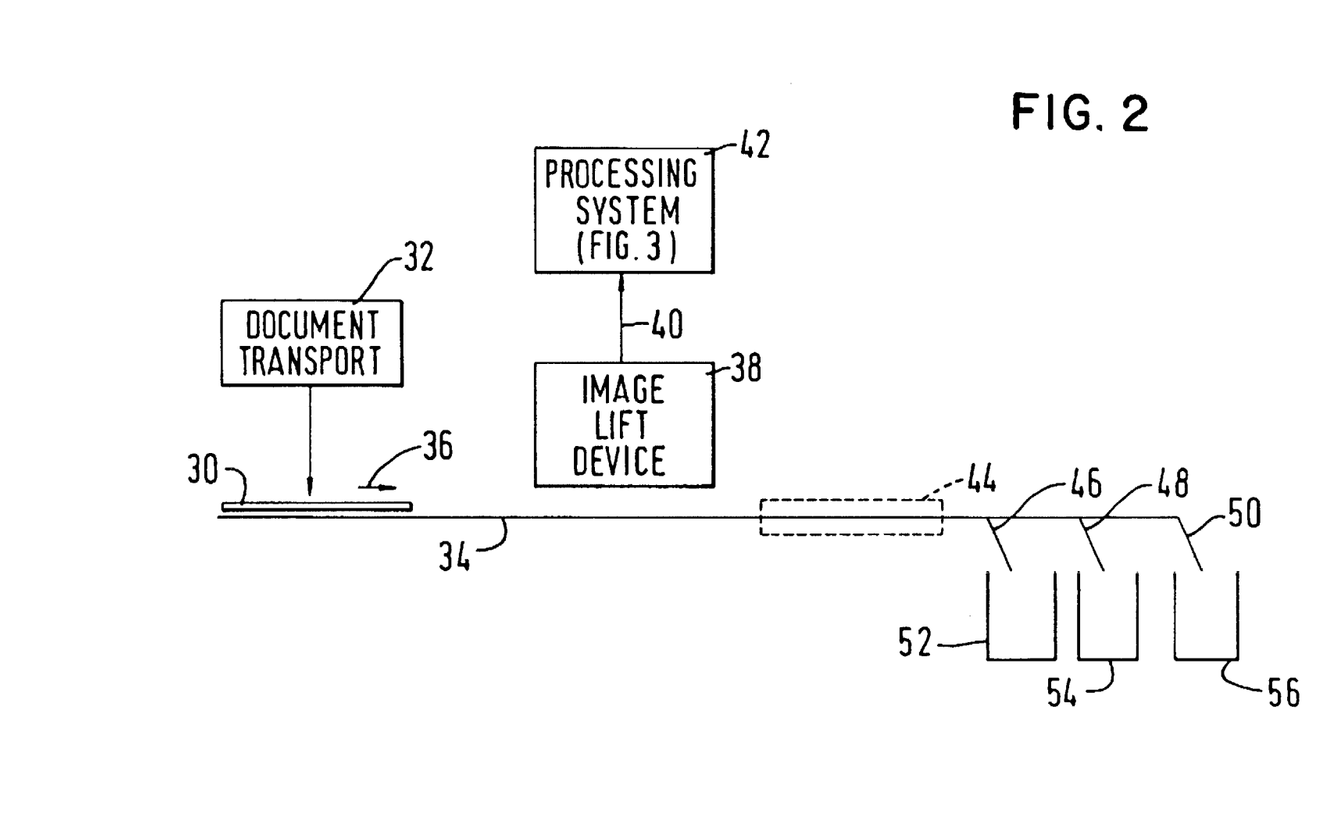
FIG. 2 is a simplified diagram illustrating the passage of a document through the terminal shown in FIG. 1.

Referring now to FIG. 2, there is shown a diagram illustrating in simplified schematic form the movement of a document 30 through the terminal 10 (FIG. 1). The document 30, after insertion in the document entry slot 16 (FIG. 1) is moved by a document transport system 32 along a feed path 34 in the direction of the arrow 36. The document 30 is fed past an image lift device 38 which senses the document 30 and provides digital signals representative of the sensed areas (pixels) in known manner, such digital signals being supplied over a line 40 to a processing unit or system 42. The document 30 is then fed further along the feed path to a wait station 44 where the document is held while processing takes place in the processing system 42. Following such processing the document 30 is fed via a selected diverting flap 46, 48, or 50 to a respective sorting pocket 52, 54, or 56.

Figure 3:
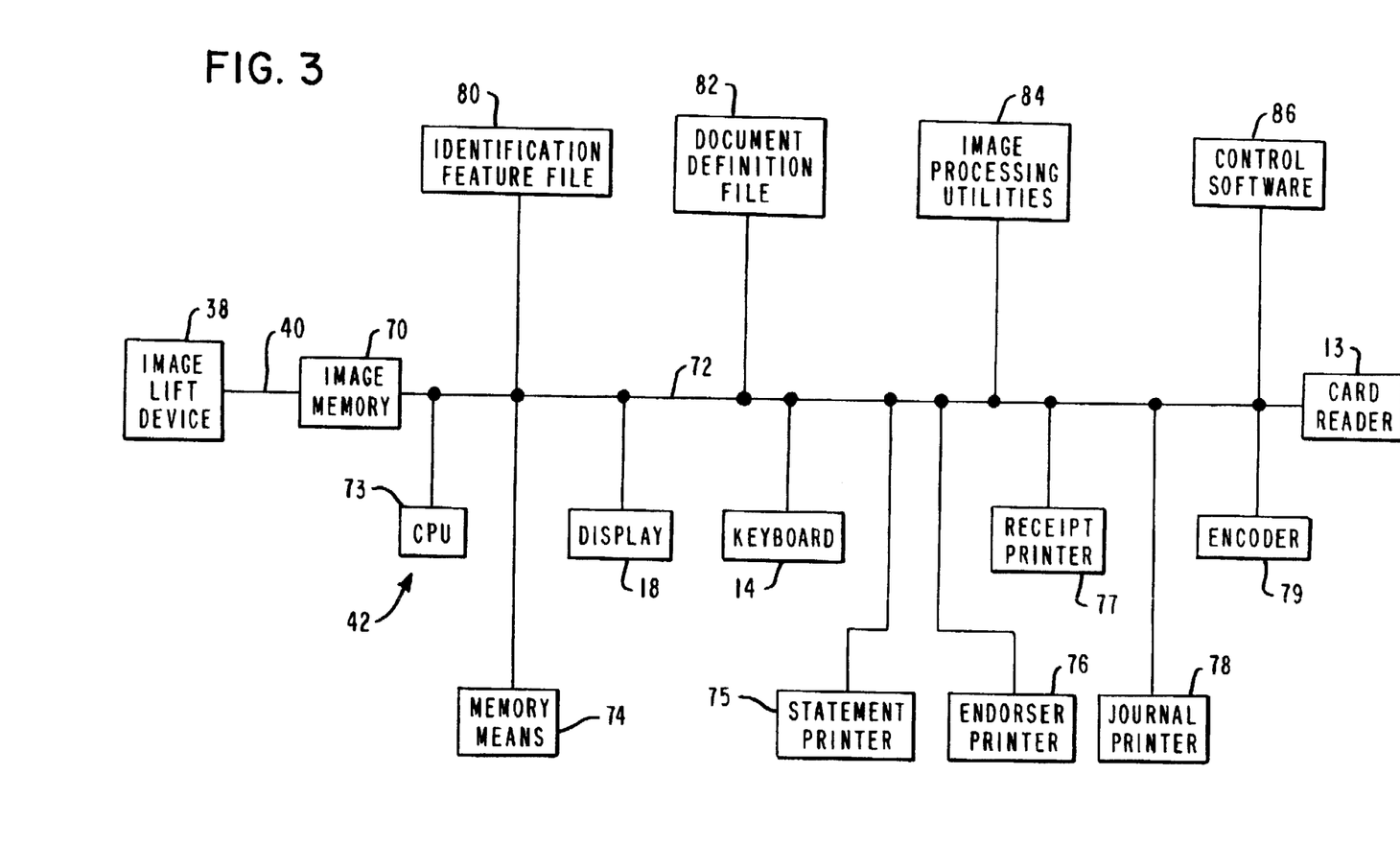
FIG. 3 is a block diagram showing the interconnection of components employed in the terminal of FIG. 1.

Referring now to FIG. 3, the processing system 42 will be briefly described. As shown in FIG. 3, the image lift device 38 is connected over the line 40 to an image memory 70, which may be RAM memory. It should be understood that the image lift device 38 is adapted to provide both a binary image (black or white pixels) used for subsequent processing and a grey scale digital image used to provide a visual display of the documents on the display 18.

The image memory 70 is connected to a bus 72 to which are connected a CPU (central processing unit) 73, memory means 74, which may be a RAM and/or disk storage, the display 18, the keyboard 14, a statement printer 75, an endorser printer 76, a receipt printer 77, a journal printer 78, an encoder 79 and a card reader 13 for reading a customer's bank card inserted in the slot 12 (FIG. 1).

Also connected to the bus 72 are further respective memory means containing an identification feature file 80, a document definition file 82, a library of image processing programs (referred to herein as utilities) 84, and control software 86. The identification feature file 80 contains a document description for each type of document 30. Each document description, referred to herein as a document feature model, includes a representation of graphical features on the document, specified by their locations and measurements on the document. Examples of graphical features are horizontal lines, vertical lines and boxes. Associated with each document feature model is a document name, identifying the document type.

The document definition file 82 contains a list of document names, each document name being associated with a document description including a list of zones on the document, together with parameters defining the properties of data contained within the respective zones. The control software 86 interprets these parameters to select an appropriate image processing utility from the library of image processing utilities 84. Also associated with each document name is an identification of regions of the document to be printed on the receipt slip for a transaction involving the document.

The image processing utilities contained in the library of image processing utilities 84 are functions which implement a particular method or technique for processing image data and making explicit the information contained within the image.

Figure 4:
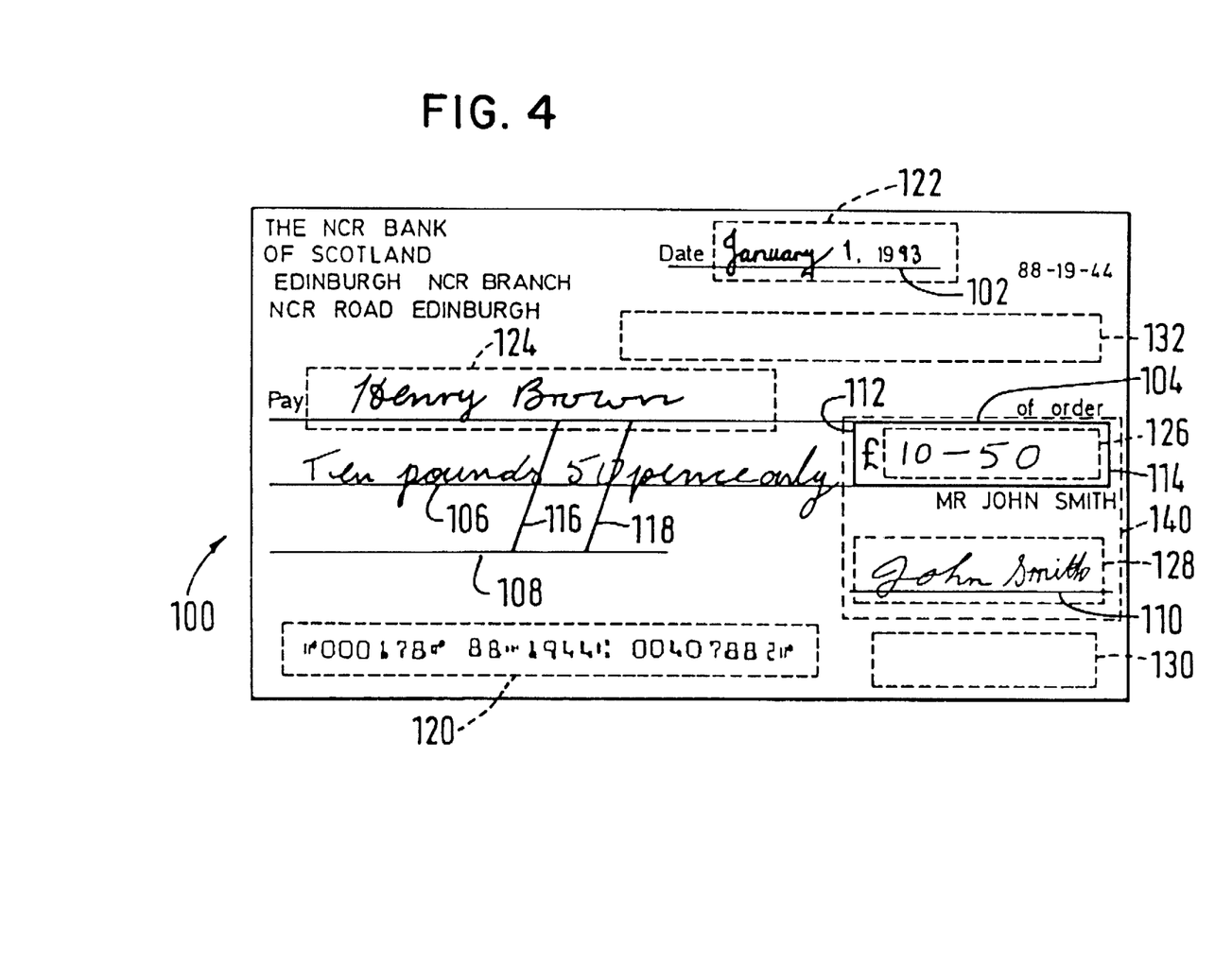
FIG. 4 shows a cheque capable of being processed by the terminal of FIG. 1.

The terminal 10 is adapted to process more than one class of documents. One class of documents relates to cheques. Referring now to FIG. 4, there is shown a typical cheque 100 capable of being accepted and processed by the terminal 10. The cheque 100 is a printed form containing printed information thereon and graphical features such as horizontal lines 102, 104, 106, 108, and 110, vertical lines 112 and 114, and sloping lines 116 and 118. The printed information includes a printed code line disposed in a code line zone 120. When inserted into the terminal 10, the cheque 100 also contains handwritten information, including the date written in date zone 122, the payee's name written in a payee name zone 124, a handwritten amount written in words, a courtesy amount written in figures in a courtesy amount zone 126, and a signature, written in a signature zone 128. Other zones on the cheque 100 are blank when the cheque is inserted in the terminal 10 and may be printed by the printer 76 and/or the encoder 79 during processing of the document in the terminal 10. These zones include an encoding zone 130 and an endorsement zone 132. Also shown in FIG. 4 is a region 140 which will be printed on the receipt slip for the transaction.

It will be appreciated that cheques emanating from a large number of different banks may be processed by the terminal 10. Although such cheques all contain identical types of information, such as payee's name, date, amount, bank code and signature, the actual locations of this information may be different for the cheques of different banks.

Figure 5:
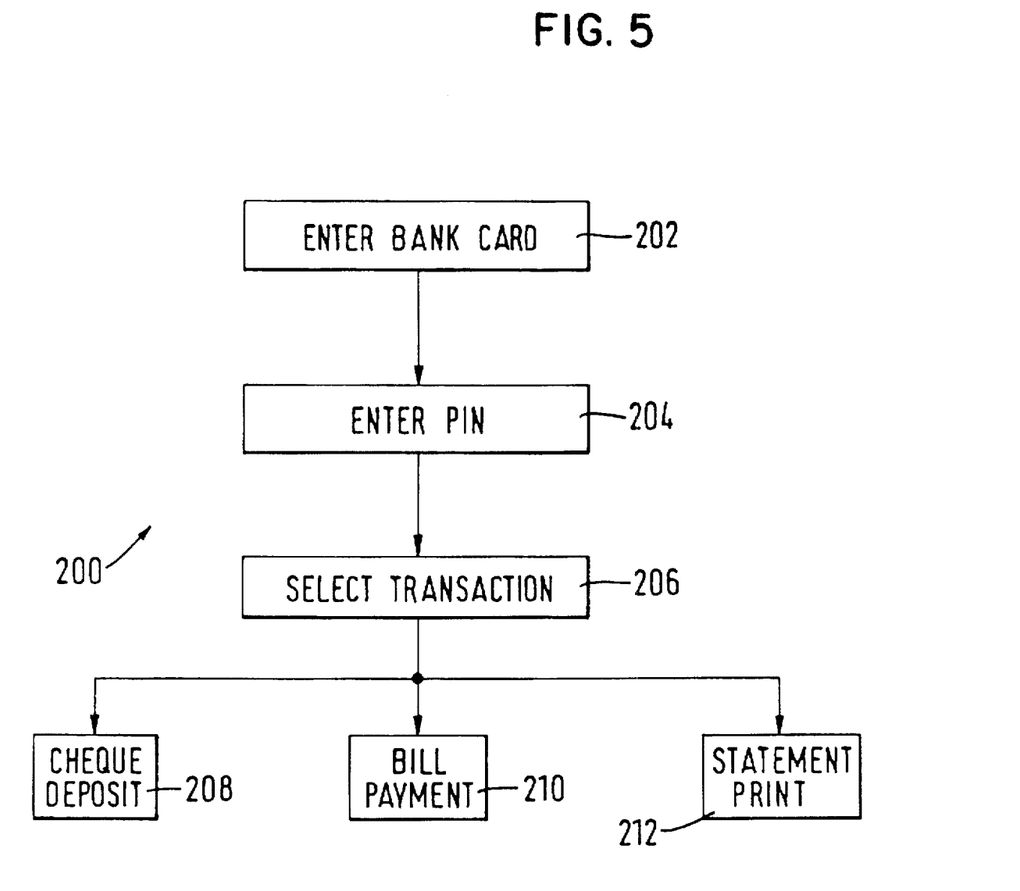
FIG. 5 is a flowchart illustrating the selection of a transaction type by a customer operating the terminal of FIG. 1.

A typical manner in which the terminal 10 is operated by a customer will now be described. Referring to FIG. 5, which shows a transaction flowchart 200, operation is commenced by the customer inserting his bank card in the slot 12 (FIG. 1) as shown in block 202. The customer then enters his PIN (personal identification number) via the keyboard 14 (block 204), to verify authorized use of the bank card. The customer may select (block 206), a cheque deposit transaction (block 208), a bill payment transaction (block 210), or a statement print transaction (block 212). The statement print transaction, which causes the terminal 10 to print out a statement of the customer's account is not pertinent to the present invention, and will not be discussed further herein.

Figure 6:
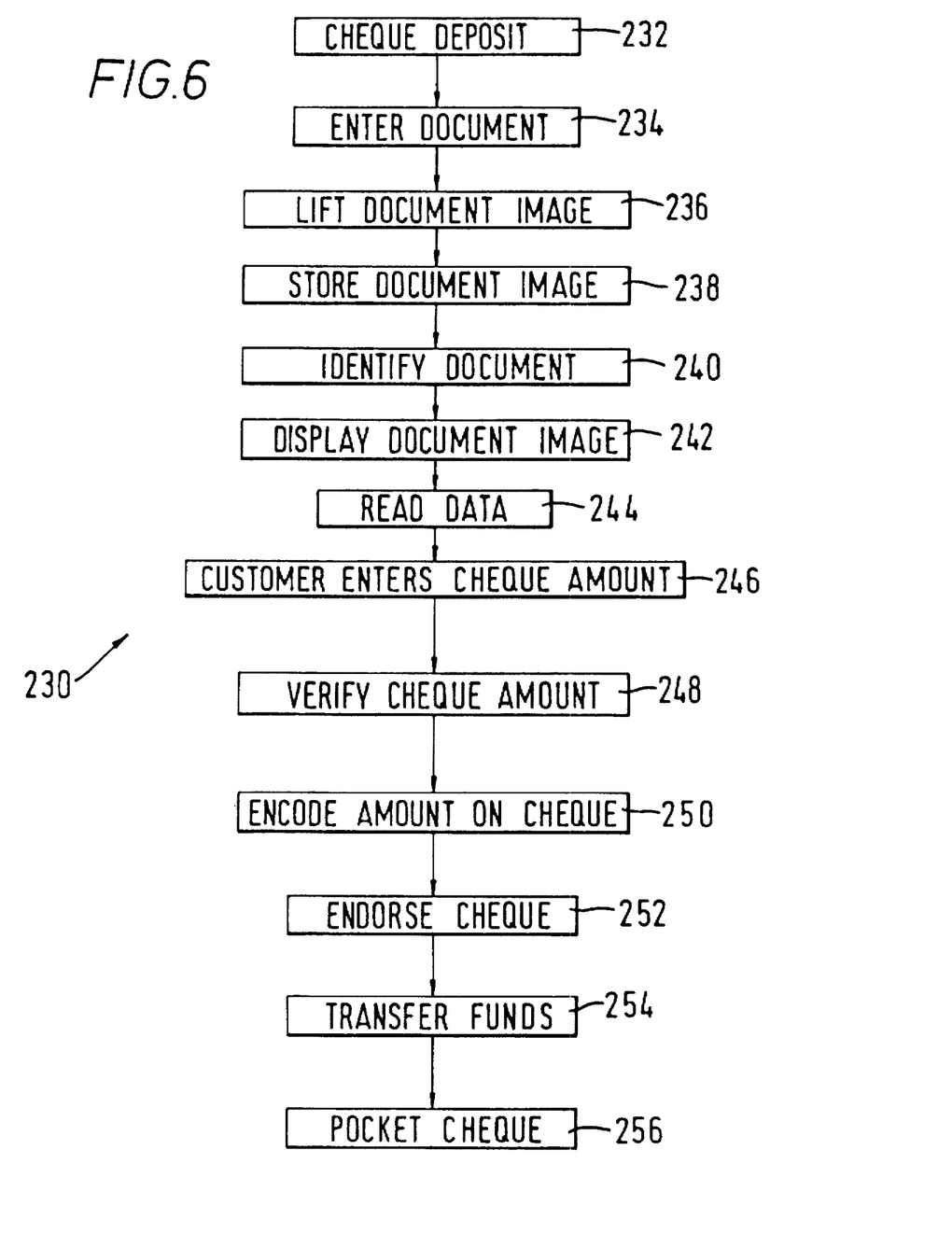
FIG. 6 is a flowchart illustrating the processing of a cheque by the terminal of FIG. 1.

Referring now to FIG. 6, there is shown a flowchart 230 illustrating the deposit function operation of the terminal 10 for a typical cheque deposit transaction (block 232). The customer inserts the cheque document into the document entry slot 16 (FIG. 1) (block 234). The image lift device 38 (FIGS. 2 and 3) then lifts the document image (block 236) and stores the image in the image memory 70 (FIG. 3) (block 238). The document is then identified (block 240), that is, a procedure is carried out which ascertains the particular cheque type, dependent on which bank or financial institution issued the cheque. Briefly, this procedure involves extracting graphical features, such as straight lines (and, possibly, boxes), and arranging these extracted graphical features in a feature specifying their locations to provide a graphical feature description constituting a document feature model. This document feature model is then compared with document feature models extracted from the identification feature file 80 (FIG. 3) to identify the cheque and provide a document name for the cheque document. The document image is then displayed on the display screen 18 (block 242) to reassure the customer that the transaction is proceeding correctly, and to allow the customer to view the displayed document. This display step is optional and may be omitted in some applications. Data is then read from the document image (block 244); this includes the location of the text which is read and the type of reading utility being specified in the document definition file 82 (FIG. 3) under the relevant document name. The customer then enters the cheque amount on the keyboard 14, and the cheque amount is verified (block 248) by comparing the keyed-in amount with the courtesy amount read from zone 126 (FIG. 4) during the read data step of block 244. The cheque amount is then magnetically encoded on the cheque in zone 130 (FIG. 4) (block 250), and the cheque is endorsed by printing thereon (block 252) in the endorsement zone 132, thereby invalidating the cheque to prevent it from being used in a subsequent transaction. As shown in block 254 a funds transfer operation is then effected, wherein the value of the cheque is transferred from the payer's account, the account number of which was read from the code line zone 120 (FIG. 4), to the payee's account, the account number of which was read from the bank card inserted in the slot 12 at the commencement of terminal operation by the customer. Finally (block 256) the cheque is sent to an appropriate pocket 52-56 (FIG. 2).

Figure 7:
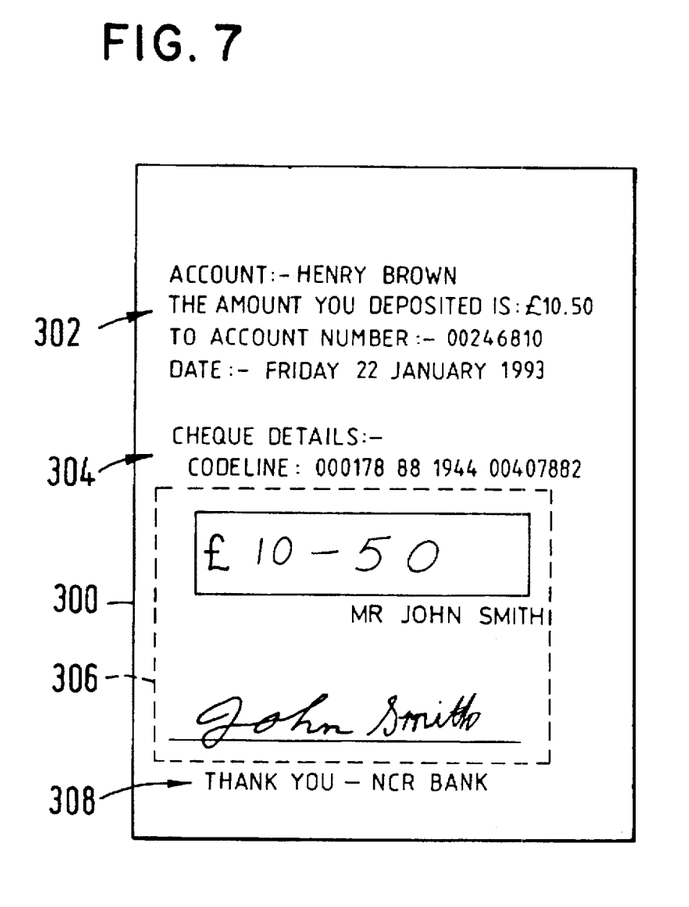
FIG. 7 shows a receipt slip issued by the terminal of FIG. 1.

Referring now to FIG. 7, there is shown a typical receipt slip 300 issued from the slot 17 (FIG. 1) as a record of a cheque deposit transaction. The receipt slip 300 contains: printed details 302 of the transaction, including the name and account number of the account into which the cheque is being paid; a printed record 304 of the codeline 120 (FIG. 4) on the cheque 100; and an image region 306 reproducing the image region 140 (FIG. 4) on the cheque 100 and including the courtesy amount zone 126 (FIG. 4) and the signature zone 128 (FIG. 4). The receipt may include additional information such as a conventional "thank you" line 308.

Figure 8:
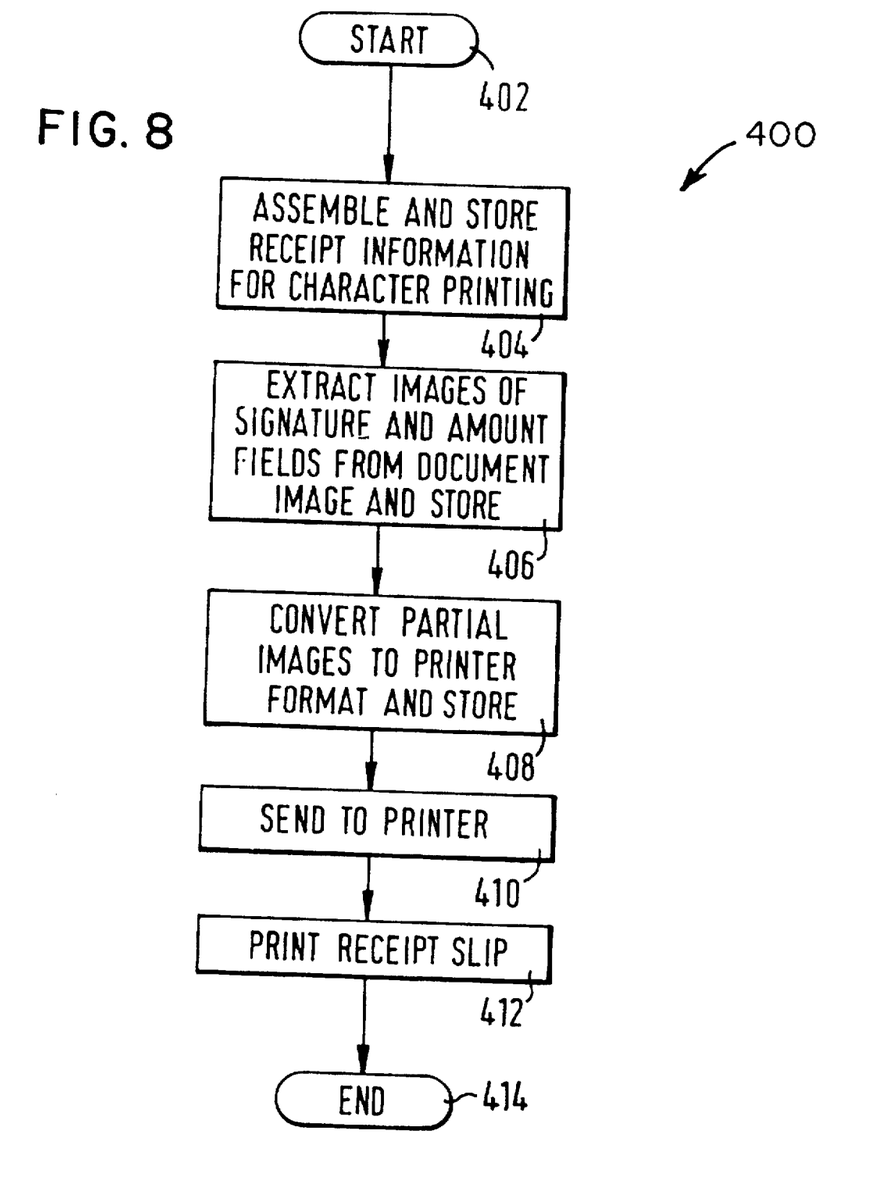
FIG. 8 is a flowchart illustrating the operation for printing a receipt slip.

Referring now to FIG. 8, the operation of the system for printing the receipt slip 300 (FIG. 7) will now be described, with reference to the flowchart 400. The operation starts as shown in block 402 and proceeds to block 404 where the information 302, 304, and 308 to be printed on the receipt slip in character format is assembled and stored in the memory means 74. The account name to be printed in the first line of the transaction details 302, is derived from the customer's card read by the card reader 13 (FIG. 3). As an alternative, the account name may be derived by reading the payee name from the zone 124 in the document 100 (FIG. 4). The second line, wherein the deposited amount is printed, is derived from reading the courtesy amount zone 126 from the stored document image. Alternatively, the deposited amount may be derived from the keyboard entry step (block 246, FIG. 6). The account number information is derived from the card reader 13 reading the customer's card, and the date information is derived from a system calendar (not shown) conventionally provided in the processing system 42. Although not shown in FIG. 7, the time at which the transaction took place may also be printed on the receipt slip 300. The code line information 304 is derived by reading the code line zone 120 from the stored document image.

Next, as shown in block 406, the images of the signature and amount fields are extracted from the document image stored in the image memory 70, and stored in the memory means 74. Next, this stored image is converted to printer format and stored again in the memory means 74 (block 408). This step may involve scaling, for example, size reduction, or enlargement of the image to provide a region which is a suitable size for reproduction on the receipt slip 300.

Then, as shown at block 410, the stored character information and converted image information are sent to the receipt printer 77 which is thereby conditioned to print the receipt slip 300 (block 412) as shown in FIG. 7. This ends the receipt slip printing operation (block 414).

According to the preferred embodiment described hereinabove, an image 306 of only the amount and signature zones on the deposited cheque is printed on the receipt slip 300. However, it will be appreciated that other zones of the cheque could be printed if desired. Also an image of the entire deposited cheque could be printed on the receipt slip. Furthermore, documents other than cheques, such as bills for payment, for example, which are being processed by the terminal 10, can have appropriate zones thereof extracted from the stored document image and printed on the receipt slip for the transaction.

In a further modification the image region 140 is also printed by the journal printer 78 to serve as an additional security record of the transaction on the journal record (not shown).

In yet another modification, where two or more cheques or other documents are deposited as part of a single transaction, then images derived from each of the cheques or other documents may be printed on a single receipt slip.

What is claimed is:

1. An automated teller machine (ATM) for allowing a bank customer to deposit the entire amount of a check having a MICR codeline field which contains characters identifying the account of the payer of the check and an amount field which contains characters representing the entire amount of the check, the ATM comprising:

a transport for accepting the check to be deposited from the bank customer;

an image lift device for (i) generating first digitized image data from the characters located in the MICR codeline field of the check, and (ii) generating second digitized image data from the characters located in the amount field of the check;

a printer for printing an image of at least a portion of the check onto a receipt to be dispensed to the bank customer; and a processing unit for (i) processing the first digitized image data to identify the account of the payer of the check, (ii) causing funds equal to the entire amount of the check to be transferred out of the account of the payer of the check and deposited into the account of the bank customer after the account of the payer of the check has been identified, (iii) processing the second digitized image data to provide an image of the characters located in the amount field of the check, and (iv) controlling the printer to print the image onto the receipt to assure the bank customer that the entire amount of the check has been deposited.

* * * * *